July 20, 1965    L. KRAMER ETAL    3,195,379
WIRE STRIPPER
Filed Jan. 10, 1964

INVENTORS
LEO KRAMER
ALFRED L. MEDESHA
JOSEPH M. LADD

3,195,379
WIRE STRIPPER

Leo Kramer, Chester, N.J., Alfred L. Medesha, Sayre, Pa., and Joseph M. Ladd, Cleveland, Ohio, assignors to Ingersoll-Rand Company, New York, N.Y., a corporation of New Jersey
Filed Jan. 10, 1964, Ser. No. 337,095
7 Claims. (Cl. 81—9.51)

This invention relates to automatic wire wrap machines and more particularly to an improved wire stripper therefore.

Heretofore, it has been known to provide many different types of wire strippers most of which were cumbersome or complicated in structure so that a layman had a great deal of difficulty in using such wire strippers. For example, the hand tool wire stripper being used by many technicians has been provided with a gripping surface which after continued use was found to wear down so that during the stripping operation the wire would slip causing a poor stripping action and in some cases resulting in injury to the operator.

As previously stated, in some of the automatic stripping machines it takes so much time to "set up" for the stripping of wire that it is impractical to use because of the time lost.

It is the general object of the present invention to avoid and overcome the foregoing and other difficulties of and objections to prior art practices by the provision of a sturdy and easily operated wire stripping device.

Another object of the present invention is to provide an inexpensive and reliable wire stripper.

Yet another object of the present invention is to provide a wire stripper which is simple in structure and capable of automatic operation.

Still another object of the present invention is to provide a reliable wire stripper which is inexpensive to build.

The aforesaid objects of the present invention, and other objects which will become apparent as the description proceeds, are achieved by providing a device for stripping insulation from an insulated wire which is provided with a clamping means for holding the wire during the stripping operation. A guide means is provided in alignment with the clamping means such that a wire fed through the clamping means will enter the guide means. An insulation cutting means is connected to the guide means for properly guiding the insulated wire into position for removal of the insulation by the insulation cutting means. There is also provided an ejector means for completely removing the insulation from the wire.

Figure 1:
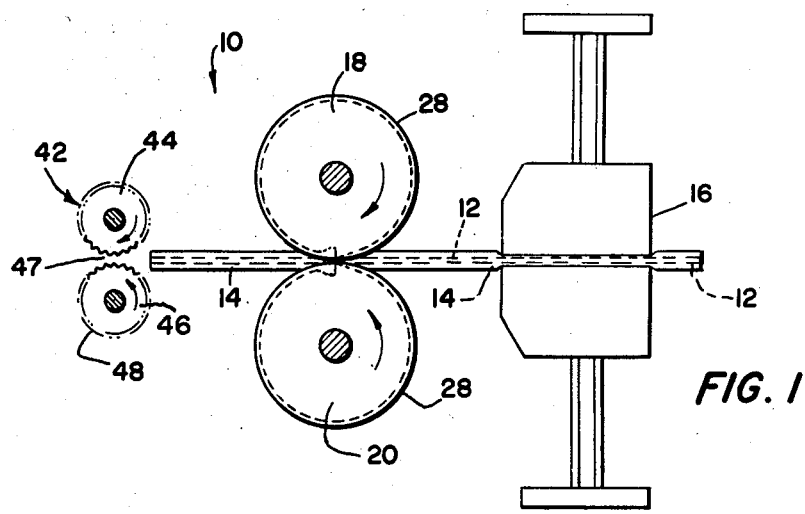
Figure 2:
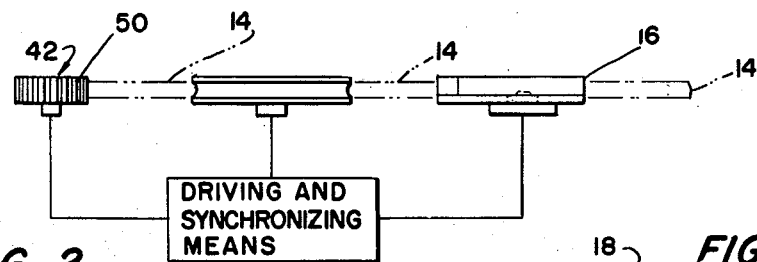
Figure 3:
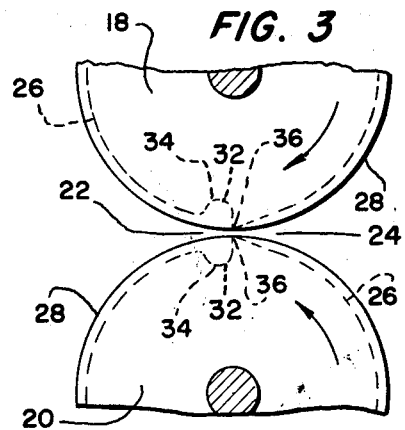
Figure 4:
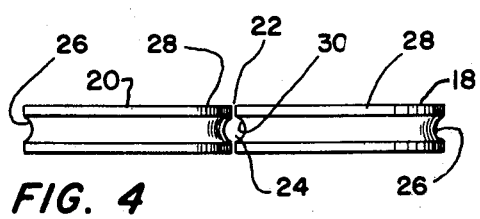
Figure 5:
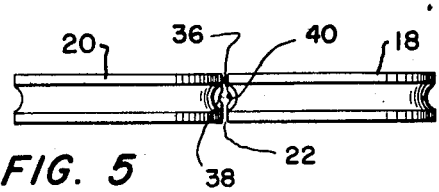

For a better understanding of the present invention reference should be had to the accompanying drawings, wherein like numerals of reference indicate similar parts throughout the several views and wherein:

FIGURE 1 is a top view of the present invention,
FIGURE 2 is a side elevation showing one means of synchronizing the holding means, cutter wheels and ejector means,
FIGURE 3 is an exploded view of the cutting knives and their relationship;
FIGURE 4 is an end view of the cutter wheels showing the guide means; and
FIGURE 5 is an end view of the cutter wheels showing the guiding means and the cutting means.

Although the principles of the present invention are broadly applicable to automatic wire wrap machines the present invention is particularly adapted for use in conjunction with stripping insulation from standard insulated wire and hence it has been so illustrated and will be so described.

With specific reference to the form of the present invention illustrated in the drawings, and referring particularly to FIG. 1, an improved wire stripper is indicated generally by the reference numeral 10.

In order to hold an insulated wire 12 from which the insulation 14 is to be stripped, a clamping means or wire clamp 16 is provided. The insulated wire 12 may be fed to the wire clamp 16 either by hand or by means of an automatic feeding device (not shown). Should an automatic feeding device be utilized, it may readily be synchronized with the wire stripping means 10.

A pair of cutter wheels 18 and 20 are provided which rotate in the direction indicated by the arrows shown in FIG. 1. The cutter wheels 18 and 20 are adjacent each other, with a small clearance space 22 therebetween. The cutter wheels 18 and 20 are so positioned that the space 22 is in alignment with the clamping means or wire clamp 16. An insulated wire 12 which is passed through the clamping means 16 will thereafter be pulled into a guide means 24 formed between the rotating cutter wheels 18 and 20, thereby guiding the insulated wire 12 in a desired path between the cutter wheels 18 and 20.

Structurally, each cutter wheel is similar. As shown in FIG. 4 an annular groove 26 is provided in the outer periphery 28 of each cutter wheel 18 and 20 such that at the point where the cutter wheels 18 and 20 converge and almost touch, a circular opening 30 (FIGURE 4) appears, which is approximately the same size as the outside diameter of the insulated wire 12. It may be seen that different cutter wheels may be used when different size wires are to be stripped, each pair of cutter wheels having the appropriate size annular groove 26 in its outer periphery 28 to form the desired size guide means 24.

Also provided on the outer periphery 28 of the cutter wheels 18 and 20 are insulation cutting means or insulation knife 32. As shown in FIG. 3 at least one insulation knife 32 is connected to each cutter wheel 18 and 20. The insulation knife 32 is disposed in a recess 34 on the outer periphery 28 of each cutter wheel 18 and 20, and is so disposed that its cutting edge 36 is even with the outer periphery 28 of the cutter wheel 18. The cutting edge 36 of each insulation knife is also provided with a small groove 38 the diameter of which is approximately the same size of the metal core of the wire 12 from which the cutting edge 36 is to strip the insulation 14 therefrom.

As shown in FIG. 5, when the insulation knives 32 of each cutter wheel 18 and 20 are in an adjacent position the small grooves 38 of each cutting edge 36 will form a circular opening 40 which will accommodate the core of the wire 12, while the cutting edges 36 of each insulation cutting knife 32 will cooperate to cut through the insulation surrounding the core of the wire 12.

It should be noted that the cutter wheels 18 and 20 are rotating, as indicated by the arrows in FIG. 1, and that these cutter wheels 18 and 20 are synchronized such that the insulation knives 32 are oppositely disposed and contiguous at the point where the outer periphery 28 of the cutter wheels 18 and 20 are closest.

After the cutting operation, the continued rotation of the cutting knives 32 will push the insulation 14 forward. This may be done because at the time the cutting operation is being performed the clamping means 16 has been closed around the wire 12 and is holding it fast so that the forward motion of the insulation cutting means 32 after the cutting operation, will push the severed insulation 14 forward off the wire core and away from the wire 12 being held fast by the clamping means 16.

In order to remove the insulation 14 from the wire 12, an ejector means 42 is provided with comprises a pair of insulation ejector wheels 44 and 46 which are disposed adjacent one another having a space 47 therebetween. The ejector wheels 44 and 46 are placed forwardly of the cutter wheels 18 and 20 with the space 47 being in alignment with the space 22 between the cutter wheels 18 and 20. The ejector means 42, is continually rotating, as indicated by the arrows, and the insulation 14 which is severed and pushed forward by the cutting edges 36, of the insulation cutting means 32, is caught in the space 47 between the rotating ejector wheels 44 and 46 and is pulled away from and off the wire 12 that is being stripped.

The outer periphery 48 of each ejector wheel 44 and 46 carries serrations 50, thereby exposing non-slip surfaces to grab the insulation 14 pushed forward by the cutting edges 36 of the rotating insulation cutting means 32.

The position of the ejector wheels 44 and 46 may be varied in relation to the cutter wheels 18 and 20 and in accordance with the length of wire allowed to pass between the cutter wheels 18 and 20 before the stripping operation is performed. It may be seen that the length of insulation removed from the wire 12 varies in accordance with the length of the wire 12 initially fed between the cutter wheels 18 and 20. When the length of removed insulation 14 is varied, the position of the ejector means 42 must be varied so that after the insulation 14 has been severed from the wire 12 the small push forward of the insulation 14 by the cutting edges 36 will move the severed piece of insulation 14 into contact with the rotating insulation ejector wheels 44 and 46.

*Operation*

The wire 12 from which the insulation 14 is to be stripped is fed through the clamping means 16 and into the space 22 between the cutter wheels 18 and 20 and into the guide means 24. The cutter wheels 18 and 20 are rotated, and at a point before the insulation cutting means 32 is in position to sever the insulation 14, the clamping means 16 is closed holding the wire 12 tightly in a fixed position. The cutter wheels 18 and 20 continue to rotate until the cutting edges 36 sever the insulation 14, without cutting the core of the wire 12, and thereafter the continued rotation of the cutter wheels 18 and 20 and cutting edges 36 of the insulation cutting means 32 push the severed insulation 14 forward enough into the space 47 between the ejector wheels 44 and 46 to be caught between the rotating insulation ejector wheels 44 and 46. The severed insulation 14 is thereafter caught between the insulation ejector wheels 44 and 46 and pulled off the wire 12, thereby exposing a length of wire from which insulation has been stripped. The clamping means 16 may then be opened and the stripped length of wire may thereafter be removed.

It will be recognized by those skilled in the art that the objects of the present invention have been achieved by providing a simple and inexpensive wire stripper which is capable of automatic operation and yet is sturdy and reliable.

While in accordance with the patent statutes a preferred embodiment of the present invention have been illustrated and described in detail, it is to be particularly understood that the invention is not limited thereto or thereby.

We claim:

1. Apparatus for stripping insulation from an insulated wire comprising:
   (a) clamping means for holding said insulated wire,
   (b) cutter wheels disposed adjacent one another and being oppositely rotatable forming a small space therebetween,
      (1) said small space being in alignment with said clamping means,
   (c) guide means formed on the outer periphery of said cutter wheels,
   (d) insulation cutting means connected to said guide means for severing the insulation from said wire, and
   (e) ejector means in alignment with said guide means and insulation cutting means for removing said insulation from said wire,
      (1) said insulation cutting means after severing the insulation pushing said insulation into contact with said ejector means.

2. Apparatus for stripping insulation from an insulated wire comprising:
   (a) clamping means for holding the insulated wire,
   (b) guide means in alignment with said clamping means for guiding the wire in a desired path,
   (c) insulation cutting knives connected to said guide means for severing the insulation from said insulated wire,
      (1) each of said insulation cutting knives being provided with a cutting edge having a groove therein to accommodate the wire so that the wire will not be cut, and
   (d) ejector means in alignment with said guide means and insulation cutting means for removing said insulation from said wire,
      (1) said insulation cutting knives after severing the insulation pushing said insulation into contact with said ejector means.

3. Apparatus for stripping insulation from an insulated wire comprising:
   (a) clamping means for holding the insulated wire,
   (b) guide means in alignment with said clamping means for guiding the wire in a desired path,
   (c) insulation cutting means connected to said guide means for transversely severing a length of insulation from the remaining insulation on said wire, and
   (d) ejector wheels disposed adjacent one another and being oppositely rotatable forming a space therebetween for removing the severed length of insulation from said wire,
      (1) said space being in alignment with said guide means,
      (2) said insulation cutting means after severing the length of insulation, pushing said severed length of insulation into the space between the ejector wheels.

4. Apparatus for stripping insulation from a wire comprising:
   (a) clamping means for holding the insulated wire,
   (b) guide means in alignment with said clamping means for guiding the wire in a desired path,
   (c) insulation cutting means connected to said guide means for transversely severing a length of insulation from the remaining insulation on said wire,
   (d) ejector wheels disposed adjacent one another and being oppositely rotatable forming a space therebetween for removing the severed length of insulation from said wire,
      (1) said insulation cutting means after severing the length of insulation pushing said severed length of insulation into the space between said ejector wheels, and
   (e) gripping surfaces on the outer periphery of said ejector wheels for gripping the severed length of insulation pushed into the space between the ejector wheels by said insulation cutting means,
      (1) said space being in alignment with said guide means.

5. Apparatus for stripping insulation from an insulated wire comprising:
   (a) clamping means for holding the insulated wire,
   (b) cutter wheels disposed adjacent one another and being oppositely rotatable forming a space therebetween,
      (1) said space being in alignment with said clamping means,
   (c) guide means formed on the outer periphery of said cutter wheels,
   (d) insulation cutting knives connected to said cutter wheels for severing the insulation from said insulated wire,
      (1) said insulation cutting knives being provided with a cutting edge having a groove therein to accommodate the wire so that the wire will not be cut, and
(e) ejector means in alignment with said guide means and insulation cutting knives for removing said insulation from said insulated wire,
  (1) said insulation cutting knives after severing the insulation pushing said insulation into contact with said ejector means.

6. Apparatus for stripping insulation from an insulated wire comprising:
(a) clamping means for holding the insulated wire,
(b) cutter wheels disposed adjacent one another and being oppositely rotatable forming a space therebetween,
  (1) said space being in alignment with said clamping means,
(c) guide means formed by an annular groove in the outer periphery of said adjacently disposed cutter wheels,
  (1) said annular grooves cooperating to form a generally circular opening between the adjacent cutter wheels,
(d) insulation cutting knives connected to said cutter wheels for severing the insulation from said insulated wire,
  (1) said insulation cutting knives being provided with a cutting edge having a groove therein to accommodate the wire so that the wire will not be cut, and
(e) ejector means in alignment with said guide means and insulation cutting knives for removing said insulation from said insulated wire,
  (1) said insulation cutting knives after severing the insulation pushing said insulation into contact with said ejector means.

7. Apparatus for stripping insulation from an insulated wire comprising:
(a) clamping means for holding the insulated wire,
(b) cutter wheels disposed adjacent one another and being oppositely rotatable with their outer peripheries forming a space therebetween,
  (1) said space being in alignment with said clamping means,
(c) guide means formed by an annular groove in the outer periphery of said adjacently disposed cutter wheels,
  (1) said annular grooves cooperating to form a generally circular opening between the adjacent cutting wheels for guiding said insulated wire in a desired path,
(d) insulation cutting knives connected within said annular grooves for severing the insulation from said insulated wire,
  (1) said insulation cutting knives being provided with a cutting edge having a groove therein to accommodate the wire so that the wire will not be cut by the cutting edges,
(e) ejector wheels disposed adjacent one another and being oppositely rotatable forming a space therebetween for removing said insulation from said wire,
  (1) the space between said ejector wheels being in alignment with said guide means,
  (2) said insulation cutting knives after severing the insulation pushing said insulation into the space between said ejector wheels, and
(f) gripping surfaces disposed on the outer periphery of said ejector wheels for gripping the insulation pushed into the space between the ejector wheels by said insulation cutting knives.

References Cited by the Examiner

UNITED STATES PATENTS

| | | | |
|---|---|---|---|
| 1,052,271 | 2/13 | Pessin | 81—9.51 |
| 1,800,917 | 4/31 | Weis | 81—9.51 |
| 1,874,216 | 8/32 | Andren | 81—9.51 |
| 2,765,685 | 9/56 | Stratman et al. | 81—9.51 |
| 3,136,045 | 6/64 | De Rieux et al. | 81—9.51 X |

WILLIAM FELDMAN, *Primary Examiner.*

MILTON S. MEHR, *Examiner.*